(12) United States Patent
Jedneak

(10) Patent No.: US 8,905,702 B1
(45) Date of Patent: Dec. 9, 2014

(54) CABLE-DRIVEN TRAILER LOADING SYSTEM FOR LINER

(71) Applicant: Inland Pipe Rehabilitation, LLC, The Woodlands, TX (US)

(72) Inventor: Allan Ray Jedneak, Andover, MN (US)

(73) Assignee: Inland Pipe Rehabilitation, LLC, The Woodlands, TX (US)

( * ) Notice: Subject to any disclaimer, the term of this patent is extended or adjusted under 35 U.S.C. 154(b) by 107 days.

(21) Appl. No.: 13/785,153

(22) Filed: Mar. 5, 2013

(51) Int. Cl.
*B60P 1/54* (2006.01)
*B60P 1/00* (2006.01)

(52) U.S. Cl.
CPC .......................... *B60P 1/00* (2013.01)
USPC ........... 414/542; 414/539; 414/679; 414/812; 212/328; 212/343

(58) Field of Classification Search
USPC ................. 414/467, 539, 679, 811, 503, 812; 254/326, 327, 335, 336, 337, 338; 212/328, 343, 344
See application file for complete search history.

(56) References Cited

U.S. PATENT DOCUMENTS

| | | | | | |
|---|---|---|---|---|---|
| 3,006,486 | A | * | 10/1961 | Gruble et al. | 414/542 |
| 3,207,329 | A | * | 9/1965 | Bevard | 414/143.2 |
| 3,482,715 | A | * | 12/1969 | Worthington | 414/542 |
| 3,482,716 | A | * | 12/1969 | Leadley | 414/543 |
| 3,572,513 | A | * | 3/1971 | Tantlinger et al. | 212/180 |
| 3,786,936 | A | * | 1/1974 | Staadt | 212/291 |
| 3,976,202 | A | * | 8/1976 | Bauvin | 212/322 |
| 3,994,401 | A | * | 11/1976 | Tax et al. | 212/228 |
| 4,194,867 | A | * | 3/1980 | Bragg | 414/542 |
| 4,316,696 | A | * | 2/1982 | Hoyerman | 414/542 |
| 4,425,071 | A | * | 1/1984 | Dunbar | 414/542 |
| 4,471,945 | A | * | 9/1984 | McGraw | 254/326 |
| 4,685,983 | A | * | 8/1987 | Long, Jr. | 156/64 |
| 4,776,370 | A | * | 10/1988 | Long, Jr. | 138/98 |
| 5,062,760 | A | * | 11/1991 | Samaniego | 414/542 |
| 5,338,147 | A | * | 8/1994 | Kucharczyk et al. | 414/542 |
| 7,048,491 | B2 | * | 5/2006 | Windbergs | 414/542 |
| 8,322,967 | B2 | * | 12/2012 | Owens et al. | 414/542 |
| 8,708,172 | B2 | * | 4/2014 | Kim et al. | 212/328 |
| 2004/0060886 | A1 | * | 4/2004 | Windbergs | 212/179 |
| 2005/0211654 | A1 | * | 9/2005 | Waisanen | 212/330 |
| 2006/0180564 | A1 | * | 8/2006 | Keppel | 212/330 |

FOREIGN PATENT DOCUMENTS

JP        62080138 A  *  4/1987

* cited by examiner

*Primary Examiner* — Kaitlin Joerger
(74) *Attorney, Agent, or Firm* — Marshall, Gerstein & Borun LLP

(57) ABSTRACT

A cable-driven liner loading system for loading of an invertible liner onto a trailer bed and unloading the invertible liner from the trailer bed. A movable trolley is supported between a pair of tracks defined by C-shaped members. The movable trolley is actuated by a cable system that is driven by a winch and a set of pulleys, permitting the movable trolley to move along an axis of the trailer bed to facilitate loading of the invertible liner in a serpentine-like manner.

30 Claims, 9 Drawing Sheets

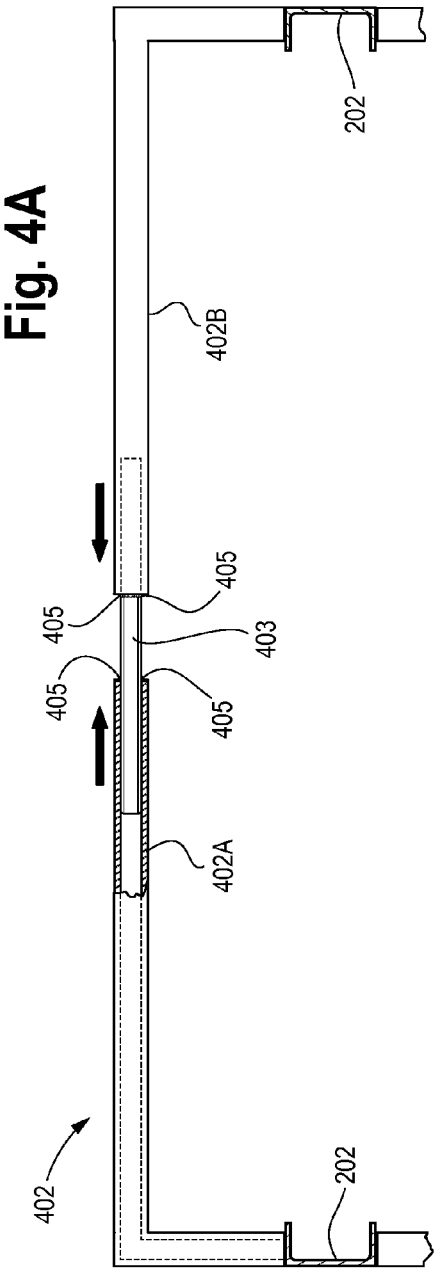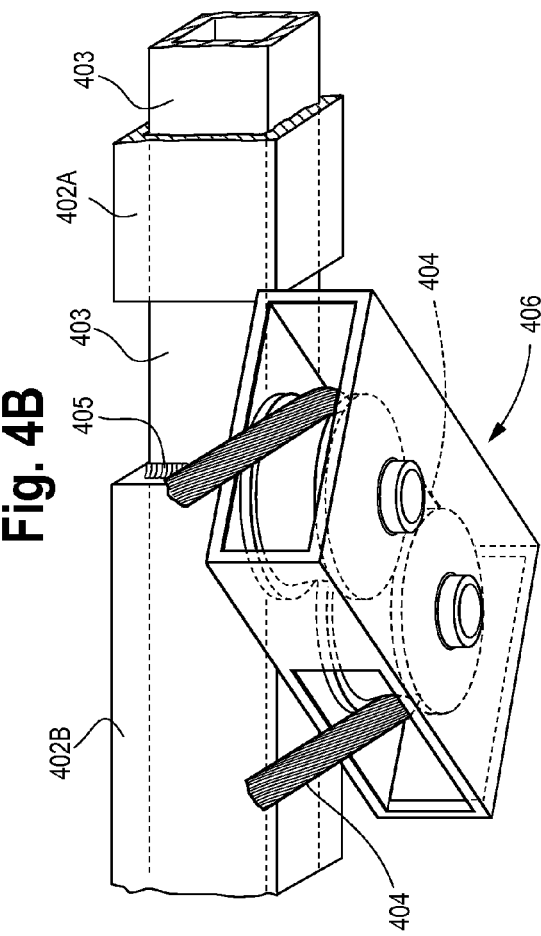

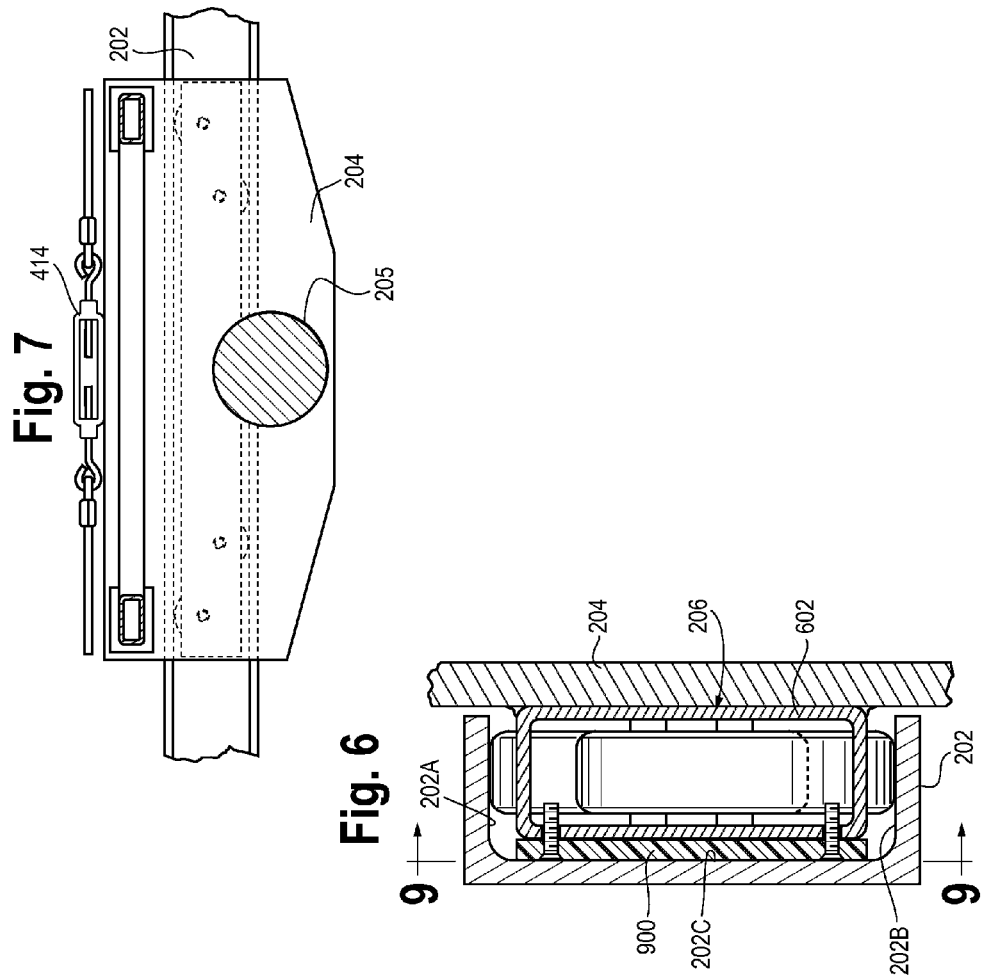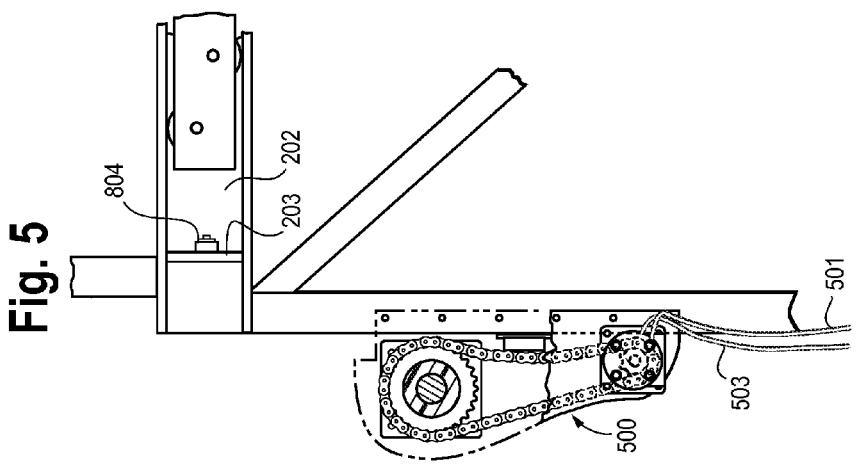

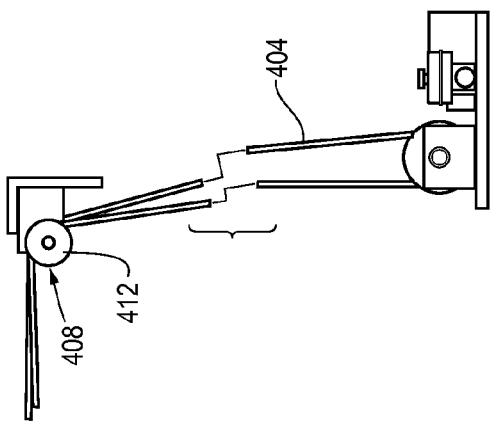
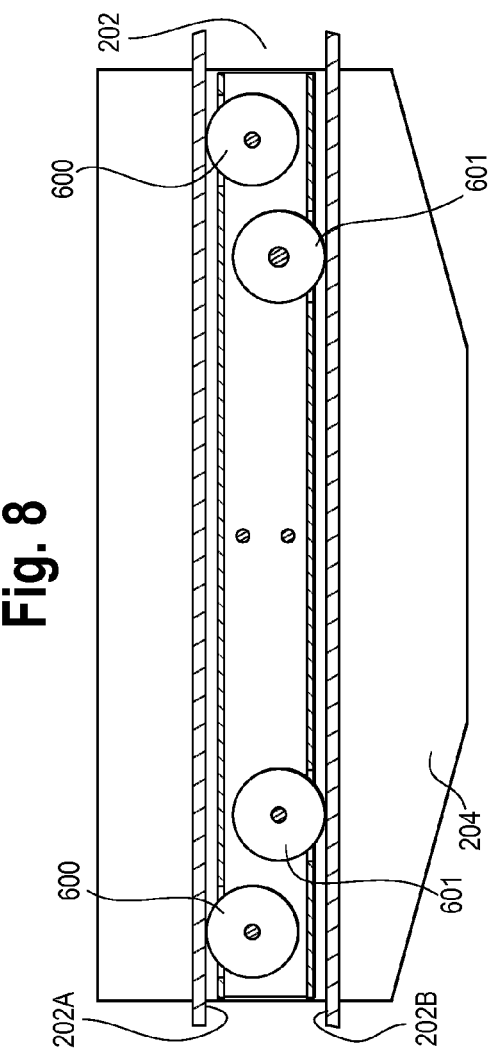
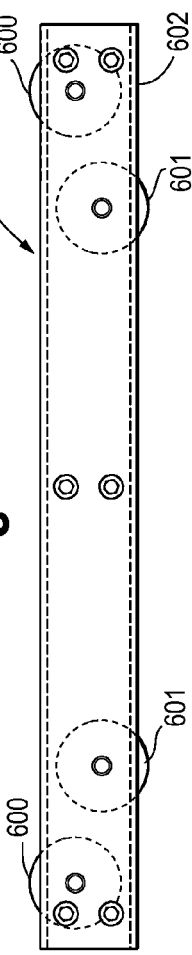

CABLE-DRIVEN TRAILER LOADING SYSTEM FOR LINER

FIELD OF THE DISCLOSURE

This disclosure relates generally to loading systems for use in trailer beds of trailers and, more specifically, to cable-driven loading systems operable to assist in the loading and deployment of invertible liners used in the reinforcement and rehabilitation of underground conduit systems.

BACKGROUND

Resin-impregnated invertible liners are commonly deployed in underground conduit systems for reinforcing cement or corrugated steel conduits that have degraded with the passage of time and exposure to the elements. Invertible liners may have a variety of sizes depending on the diameter and length of the conduits into which they are to be installed. Loading, transportation, and deployment of such liners are labor intensive processes. While movable crane systems have been developed to assist in loading invertible liners onto trailer beds, it is typical for such crane systems to involve the use of exposed pneumatic cables running the length of the trailer, such as along the underside of the trailer roof. During operation of such loading systems, the temperature of the exterior of the pneumatic cables increases. Because the invertible liner material is sensitive to heat, operations of these conventional crane systems have to be carefully carried out in a manner that avoids compromising the integrity of the liners during loading, transportation, or deployment.

Another drawback of conventional systems for facilitating the loading and unloading of invertible liners is that the controls for operating the movable components of the system to effect or prepare for loading or unloading of the invertible liner are located in a fixed position, typically on the side of the trailer. If the trailer is stationed above a manhole on a busy roadway, or parked adjacent other vehicles, positioning an operator in close proximity to the controls may be dangerous or difficult.

The manner in which these and other drawbacks of conventional liner loading systems is overcome is described in more detail in the following sections of the present disclosure.

SUMMARY OF THE DISCLOSURE

A cable-driven system for loading and unloading an invertible liner onto and off of a trailer bed includes a frame and a movable trolley. The trolley is driven along inwardly-facing C-shaped tracks running the length of the frame in the trailer bed. The invertible liner is threaded over the movable trolley, and moving the movable trolley along the tracks causes the liner to be fed over the top of the movable trolley onto the trailer bed below. The liner is stacked in a serpentine manner by repeated reversals of direction of the movable trolley after the trolley has traveled in either direction along the track. Depending on the length of the liner to be loaded, it may be possible to load a plurality of liners onto a single truck bed using the loading system of the present disclosure. For instance, one might load a first liner in a serpentine manner toward a front of the truck bed, and a second liner may be loaded in a serpentine manner toward the rear of the truck bed. To accomplish this, the direction of the trolley may be reversed in shorter increments than substantially the entire length of travel of the tracks along the truck bed. Alternately, or additionally, depending on the width of the liners when laid flat or loaded in a serpentine manner, multiple liners may be loaded side-by-side, either sequentially or simultaneously.

The upper webs of the C-shaped tracks of the frame are connected by halo crossbeam structures to improve the structural integrity of the frame, and the halo crossbeam structures between the upper webs may be telescopingly collapsible, at least during a portion of the installation process, to enable the frame to be assembled outside a trailer bed and then loaded onto the trailer bed. Once installed in a truck bed, the telescoping components of each of the halo crossbeam structures can be welded together to prevent unwanted lateral collapse. A back roller may be rotatably connected to the upper rear end of the frame to assist with feeding the liner over the movable trolley, and the back roller may be driven by a system having a pressure compensated pump. Movement of the trolley is achieved by a cable that networks the trolley, several pulleys, and a winless winch. The winch is connected to a fixed displacement pump, which is powered by an engine. The fixed displacement pump connected to the winch and the pressure compensated pump connected to the back roller may be arranged with a single engine in a stacked manner, and either or both of the pumps may be controlled remotely. The engine may be battery-operated and contained in a housing with a cooling fan.

Reversal and stoppage of the movable trolley is controlled by a controller, which may either be manual or automated. For particularly long invertible liners, reversal of the movable trolley occurs after the movable trolley has traveled substantially the length of the trailer bed. When a manual controller is used, which may be a wired or wireless remote control device, an operator observes the movement of the trolley and, at a moment of their choosing, uses the manual controller to signal to the fixed displacement pump to selectively stop, or reverse direction of, the trolley. Alternately, the controller may be automated. In one embodiment with an automated controller, a microswitch is located in the lower web of one of the C-shaped tracks near either end of that track. The movable trolley has a wheel assembly, and contact between the wheel assembly of the trolley and a microswitch, or proximity of the wheel assembly to one of the microswitches, located in a track signals to the fixed displacement pump to selectively stop, or reverse the direction of, the trolley.

BRIEF DESCRIPTION OF THE SEVERAL VIEWS OF THE DRAWING

FIG. 4A is a cross-section view taken along lines 4A-4A of FIG. 4, illustrating the telescopingly-collapsible nature of the halo crossbeam structures of the loading system frame, which facilitates installation of the frame onto a trailer bed;

FIG. 4B is an enlarged bottom perspective view, of the region of FIG. 4 identified as FIG. 4B, illustrating an offset arrangement of a pair of pulleys in a first frame pulley assembly of the liner loading system of the present disclosure.

FIG. 5 is a side view, partially broken away, taken along lines 5-5 of FIG. 4, illustrating a back roller driving system for a back roller provided at the rear end of the cable-driven liner loading system of FIG. 2;

FIG. 6 is a cross-sectional view taken along lines 6-6 of FIG. 4, illustrating an end view of a wheel assembly and wheel assembly housing of a movable trolley engaged with a C-shaped channel of a track to facilitate motion of the movable trolley along a top of the cable-driven liner loading system of FIG. 2;

FIG. 7 is a plan view taken along lines 7-7 of FIG. 4, illustrating an adjustable cable connection and one side of the movable trolley of the cable-driven liner loading system engaged with an inwardly-directed C-shaped channel of a track provided along the top of the cable-driven liner loading system;

FIG. 8 is a cross-sectional view, taken along lines 8-8 of FIG. 4, illustrating the wheel bearings of one side of the movable trolley within a complementary C-shaped channel of a track as illustrated in FIG. 7;

FIG. 9 is a cross-sectional view taken along lines 9-9 of FIG. 6, illustrating a friction-reducing pad secured the wheel assembly housing of one side of the movable trolley, with a wall of a hollow bar (not shown) intermediate the roller bearings and the friction-reducing pad;

FIG. 10 is a side view, partially broken away, taken along lines 10-10 of FIG. 4, illustrating the networking between the cable, pulleys, and winch, and the connection with the engine that drives the winch, used to actuate the movable trolley of the cable-driven liner loading system;

DETAILED DESCRIPTION OF THE PREFERRED EMBODIMENTS

A method for inverting a invertible liner 100 in a hollow conduit is explained in US 20100122767 A1, the entirety of which is incorporated herein by reference. Invertible liners typically have diameters in the range of 42" to 60", though they may range anywhere from 4" to 102" in diameter, or more, and have lengths in the range of 12 feet to 1400 feet. Invertible liners are cumbersome to load onto a trailer bed 102 for delivery to a jobsite. The maximum weight of a liner that can be loaded onto a given trailer is capped by regulations governing appropriate loads depending on trailer rating, and by knowing the weight-per-foot of a given invertible liner diameter, the loader can calculate the maximum length of liner to load onto a trailer. By using a cable-driven liner loading system 104 of the present disclosure, both the loading of an invertible liner 100 onto a trailer bed 102 for transportation to an installation site, and unloading and deployment of the invertible liner 100 for reinforcing a hollow conduit, are facilitated.

Figure 1:
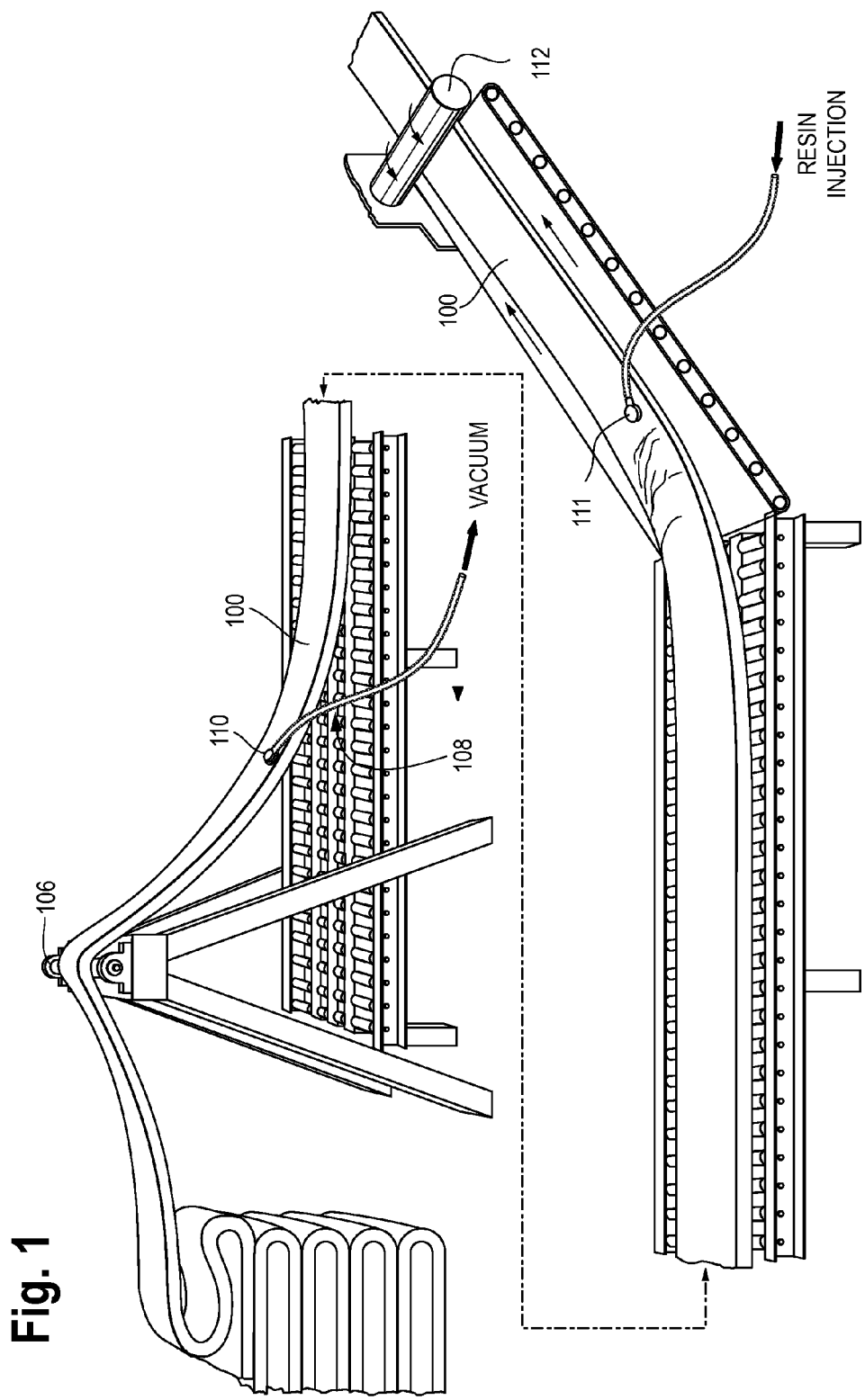
FIG. 1 is a perspective view of an elongate roller table illustrating a dual-layered invertible liner being prepared for loading onto a trailer bed by evacuating air from the invertible liner and impregnating an inner fabric layer of the invertible liner with resin.

FIG. 1 illustrates preparation of an invertible liner 100 prior to being loaded onto the trailer bed 102 via a cable-driven liner loading system 104. The invertible liner 100 is threaded over a first loading roller 106 and onto an elongate roller table 108. While resting on the elongate roller table 108, air is first vacuumed out of the invertible liner 100 via a port 110 in the invertible liner 100. Resin is then injected into an inner fabric layer 101 of the invertible liner 100 through a second port 111. A second loading roller 112 flattens the invertible liner 100 and assists in evenly distributing the resin throughout the inner fabric layer of the invertible liner 100.

Figure 2:
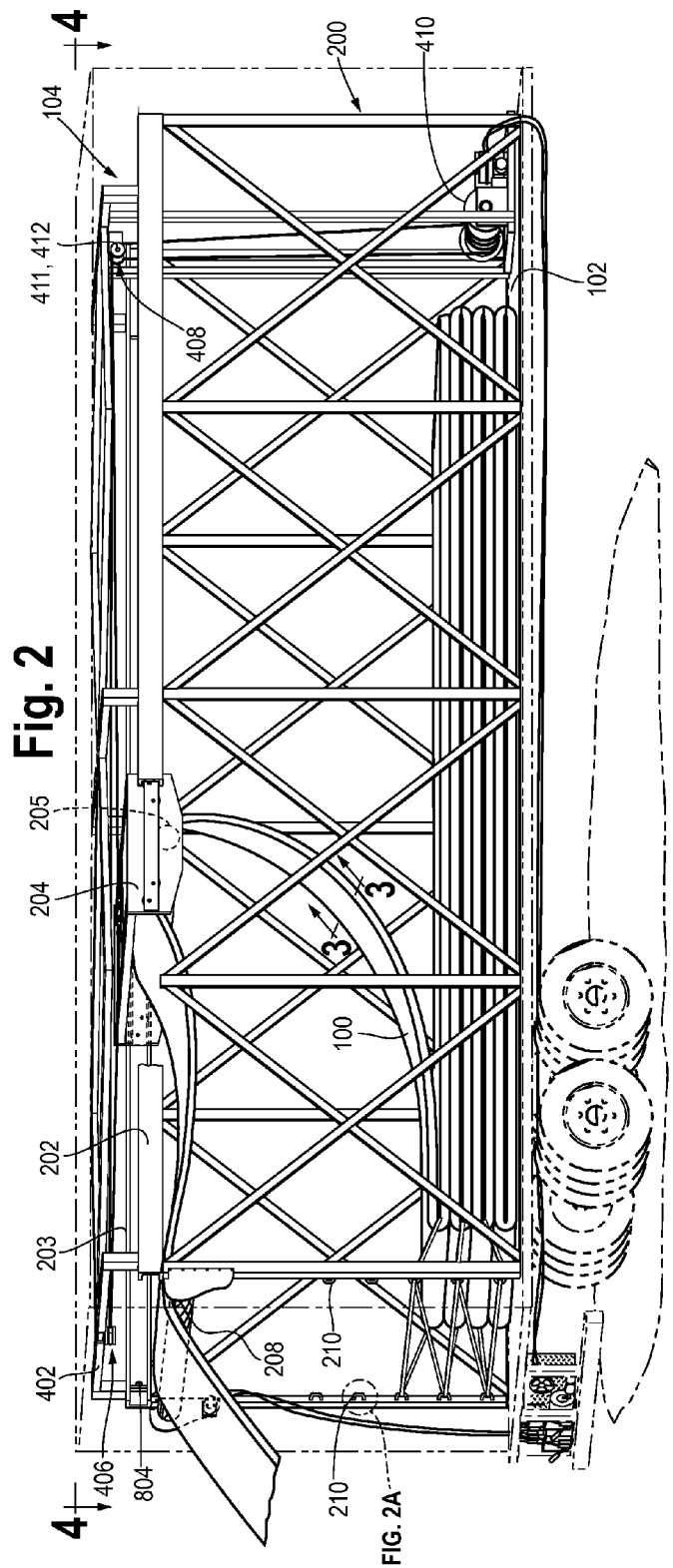
FIG. 2 is a perspective view of a trailer bed with the tires, walls, and roof thereof illustrated in dashed lines for clarity, with a cable-driven liner loading system of the present disclosure provided therein and an invertible liner being loaded onto the trailer bed.

FIG. 2 illustrates the cable-driven liner loading system 104 of the present disclosure assembled on a trailer bed 102 and loading a invertible liner 100 onto the trailer bed 102. The frame 200 of the cable-driven liner loading system 104 is rectangular and has a length, width, and height only slightly less than the length, width, and height of the trailer in which the cable-driven liner loading system is placed. Such dimensions of the cable-driven liner loading system 104 are desirable because they enable the frame 200 to be permanently secured to the interior of the trailer by, for example, welding the frame 200 to the trailer interior. Permanently securing the frame 200 to the trailer provides structural support for the cable-driven liner loading system. In addition, dimensions of the frame 200 that are only slightly less than the dimensions of the trailer are desirable because they maximize the storage space for the invertible liner 100. A common length dimension for the frame 200 would be 50 feet long, as this fits well inside a standard 53 foot long trailer, but could be anywhere in the range of 20 feet long to 50 feet long, either to fit within shorter trailers or to be accommodated in, but not occupy substantially the entire length of, a given trailer.

Tracks 202 running the length of the frame 200 are secured to the top of the frame 200 on opposite sides of the frame 200. The tracks 202 consist of two inner-facing C-shaped channels. A movable trolley 204 has a wheel assembly 206 (see FIGS. 8 and 9) on either side that is engaged with the C-shaped channels of the tracks 202. The invertible liner 100 is threaded over a roller 205 of the movable trolley 204 such that moving the movable trolley 204 in a first direction causes the invertible liner 100 to be fed over the top of the movable trolley roller 205 onto the trailer bed 102 in the first direction and moving the movable trolley 204 in a second direction causes the invertible liner 100 to be fed over the top of the movable trolley roller 205 onto the trailer bed 102 in the second direction. A back roller 208 may be rotatably connected to an upper rear end of the frame 200 to assist with feeding the invertible liner 100 over the top of the movable trolley roller 205. Additionally, a plurality of hingedly-mounted b-rings 210 may be provided along a rear vertical portion of the frame 200 to provide a way to tie off a invertible liner 100.

Figure 2A:
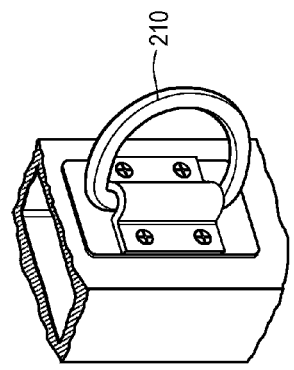
FIG. 2A is an enlarged view of one of a plurality of D-shaped rings provided at a rear end of the cable-driven liner loading system.

FIG. 2A is an enlarged view of one of the hingedly-mounted D-rings 210 provided along a vertical member at a rear end of the frame 200 of the cable-driven liner loading system 104. When the invertible liner 100 has been tied off at the D-rings, the plurality of D-rings 210 help prevent the invertible liner 100 from prematurely unfurling or falling off the back end of the trailer bed 102.

Figure 3:
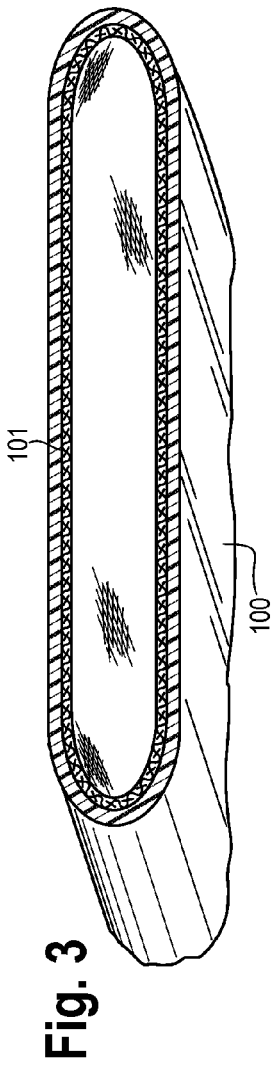
FIG. 3 is a cross-sectional view taken along lines 3-3 of FIG. 2, illustrating the layers of the invertible liner being loaded by the cable-driven liner loading system.

FIG. 3 is a cross-sectional view of the invertible liner 100 being loaded onto the trailer bed 102 by the cable-driven liner loading system 104. The inner fabric layer 101 of the invertible liner 100 is impregnated with resin, from the pre-loading process described above and illustrated in FIG. 1.

Figure 4:
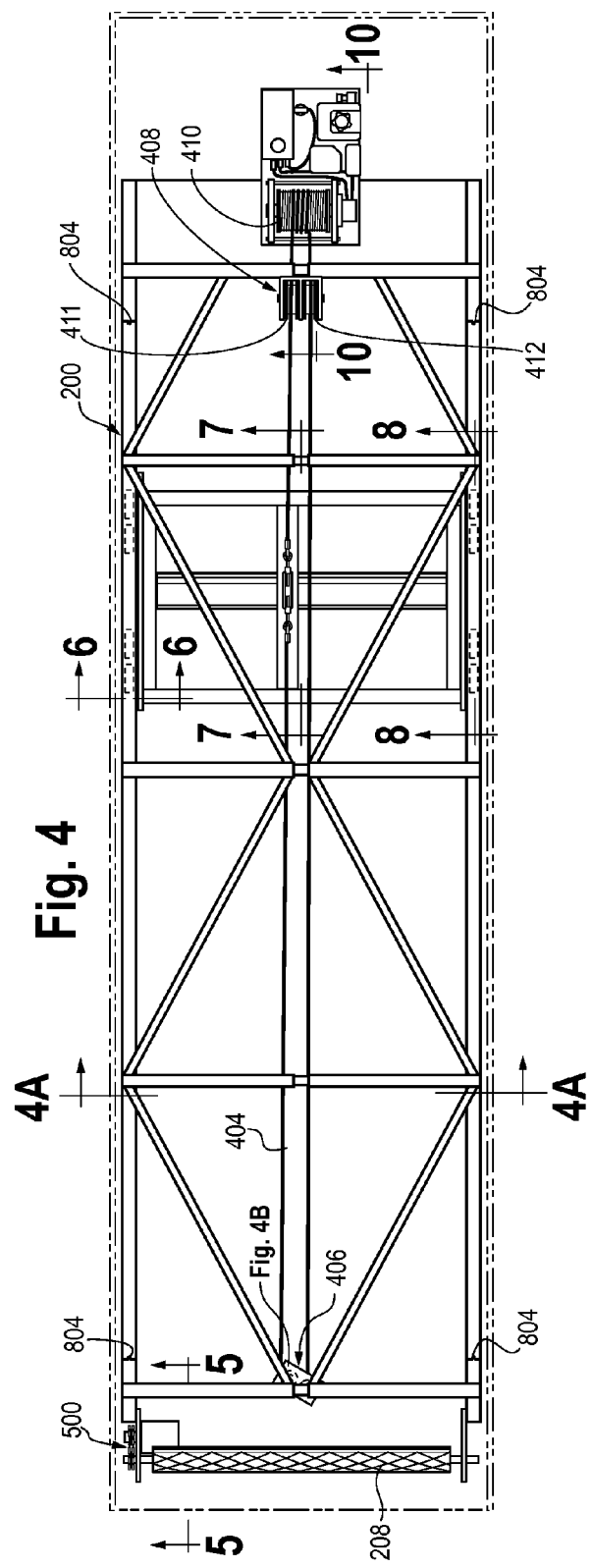
FIG. 4 is a top plan view of the liner loading system illustrated in FIG. 2, taken along lines 4-4 of FIG. 2.

FIG. 4 is a top plan view of the cable-driven liner loading system 104 illustrated in FIG. 2. Connecting the top webs of the C-shaped channels of the tracks 202 on either side of the frame 200 are halo crossbeam structures 402, also referred to herein as halos, connected perpendicularly to each side of the frame 200. The halos 402 are disposed at spaced intervals from one another. Each halo 402 may simply be a single beam. In a preferred embodiment, as illustrated in FIG. 4A, the frame 200 is laterally collapsible because each halo 402 includes at least three crossbars arranged telescopically, with an inner crossbar 403 extending substantially the width of the frame 200, enclosed within hollow crossbars 402a and 402b connected perpendicularly to opposite sides of the frame 200. The lateral collapsibility facilitates installation of the frame past the rear end of a trailer, which is relatively narrower than the walls of the trailer. Once the frame 200 is fully positioned within the trailer, the halos 402 can be laterally re-extended, then the inner crossbar 403 can be welded to the hollow crossbars 402a, 402b, as illustrated in FIG. 4A by welds 405, for lateral rigidity and structural stability. In a preferred embodiment, the cable-driven liner loading system 104 contains an odd number of halos 402. A particularly-preferred embodiment has five halos 402, spaced at approximately 5-foot intervals along the length of the frame 200.

The movable trolley 204 is moved using a cable 404. The cable 404, which is preferably a ⅝" diameter cable, networks between a first frame pulley assembly 406 at the upper rear of the frame 200, a second frame pulley 408 at the upper front of the frame 200 (including pulleys 411, 412), a winch 410 at the lower front of the frame 200, and an adjustable cable connection 414 on the movable trolley 204. In a preferred embodiment, the first frame pulley assembly 406 contains two pulleys disposed along a plane parallel to the bed of the trailer bed 102 and perpendicular to the second frame pulley 408 and third frame pulley 412. In this embodiment, the two pulleys of the first frame pulley assembly 406 are offset from one another in the longitudinal and latitudinal directions within the plane perpendicular to the second and third frame pulleys (as illustrated in FIGS. 4 and 4B). This permits the use of pulleys of desired effective diameters, for example four inch diameter pulleys, preferably with a ½" center-to-center lateral off-set, without having to impart undue lateral stresses on the cable, as might be the case if the two pulleys of the first frame pulley assembly 406 were disposed side-by-side. The second frame pulley 408 and the third frame pulley 412 are disposed in planes parallel to one another and to the sides of the trailer bed 102 and perpendicular to the first frame pulley assembly 406.

The winch 410 is disposed below the second frame pulley 408 and the third frame pulley 412. The winch 410 has a plurality of circumferential cable grooves, and in a preferred embodiment, the ratio of the number of cable grooves occupied by wraps of the cable 404 relative to the total number of cable grooves of the winch 410 is less than one. The winch 410 is operably connected to a fixed displacement pump 416. The fixed displacement pump 416 is operably connected to an engine 418, which is preferably battery-operated. The engine 418 is preferably stored in an engine housing 420 containing a cooling fan.

FIG. 5 illustrates the back roller 208 and a back roller driving mechanism 500 provided at the rear end of the frame 200 of the cable-driven liner loading system 104 of FIG. 2.

Figure 12:
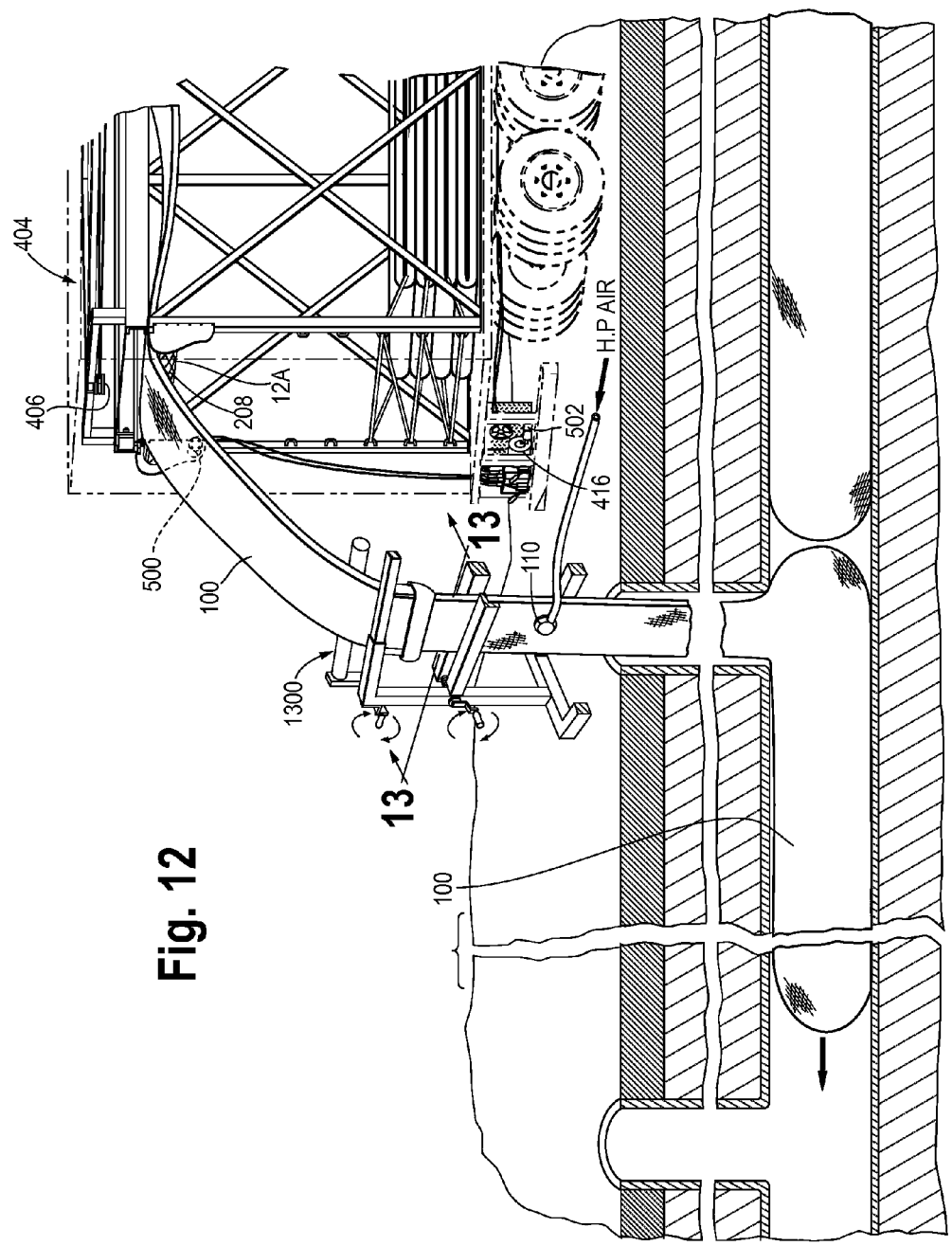
FIG. 12 is a rear perspective view illustrating a liner being unloaded from the trailer bed and fed to a frame for inversion and deployment down a manhole and along an underground conduit.
Figure 12A:
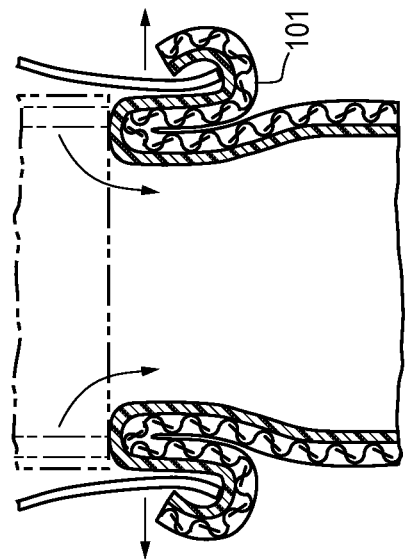
FIG. 12A is an enlarged view of the region of FIG. 12 designated 12A, illustrating a high-friction surface of a rear roller of the liner loading system.

The back roller 208 may be covered in a friction-increasing material such as vulcanized rubber, and may have grooves in a tread pattern as illustrated in FIG. 12A. The back roller driving mechanism 500 may be in communication with a pressure compensated pump 502 operably connected to the back roller 208 via a fluid supply hose 501 and a fluid return hose 503. The pressure compensated pump 502 may be located at the rear end of the cable-driven liner loading system 104, and may be arranged in a stacked manner with the engine 418 and the fixed displacement pump 416. Either the fixed displacement pump 416, the pressure compensated pump 502, or both the fixed displacement pump 416 and the pressure compensated pump 502 may be controlled using a remote control. The remote control may be a wireless remote control.

FIG. 6 illustrates an end view of the movable trolley 204 engaged with the C-shaped channel of one of the tracks 202. A wheel assembly 206 operates along the bottom web of the C-shaped channel of one of the tracks 202. Surrounding the wheel assembly 206 is a wheel assembly housing 602. The wheel assembly 206 and wheel assembly housing 602 are part of the movable trolley 204 and enable the movable trolley 204 to move along the tracks 202. The wheel assembly 206 includes a system of roller bearing wheels, which may be stainless steel wheel bearings, arranged with two upper wheels 600 (to engage and ride along a lower surface of a top web 202a of the C-shaped channel of the track 202) and two lower wheel bearings 601 (to engage and ride along an upper surface of a lower web 202b of the C-shaped channel of the track 202). One of the plurality of upper wheel bearings 600 is adjacent to an upper leading end of the wheel assembly housing 602 and another of the plurality of upper wheel bearings 600 is adjacent to an upper trailing end of the wheel assembly housing 602, while two of the plurality of lower wheel bearings 601 are disposed in a direction along the lower length of the rectangular frame of the wheel assembly 206 inboard of the two previously-described upper wheel bearings 600.

FIG. 7 provides a side view of the adjustable cable connection 414 and one side of the movable trolley 204 of the cable-driven liner loading system 104 engaged with the C-shaped channel of one of the tracks 202. The adjustable cable connection 414, which may include a turnbuckle, allows for adjustments to be made to take up any unwanted slack in the cable 404. As previously described, the cable 404 networking between the first frame pulley assembly 406, second frame pulley 408, third frame pulley 412, and winch 410 is connected to the movable trolley 204 by the adjustable cable connection 414, which enables the movable trolley 204 to be moved along the tracks 202.

The controller that actuates the winch 410 to control movement of the movable trolley 204 may be in communication with a plurality of microswitches 804. One of the microswitches 804 is located within the C-shaped channel near either end of the tracks 202. The microswitches 804 are switched by contact with, or proximity of, the wheel assembly 206. Upon being switched, the switched microswitch 804 signals to the controller associated with the fixed displacement pump 416 to selectively stop, or reverse direction of, the winch 410, thereby either stopping or reversing direction of travel of the movable trolley 204 along the tracks 202 via the networking between the winch 410, the cable 404, the second frame pulley 408, the first frame pulley assembly 406, the third frame pulley 412, and the adjustable cable connection 414. In alternate embodiments, the controller 802 is a manually-operated controller activated by a person observing the cable-driven liner loading system 104 and selectively reversing or stopping the hand controls (or remote controls) when the movable trolley 204 reaches a desired position. Each track 202 may be provided with a stop plate 203 on the lower web 202b of the C-shaped channel thereof, toward a rear end of the frame 200, to prevent the wheel assemblies 206 on either side of the movable trolley 204 from running out of a rear end of the tracks 202. If desired, the microswitches 804 toward the rear of the tracks 202 may be mounted directly to the stop plates 203.

FIG. 9 illustrates a friction-reducing pad 900 secured to an outer side of the wheel assembly housing 602 between a vertical web 202c of the C-shaped channel of the track 202 and the wheel assembly housing 602. The friction-reducing pad 900 minimizes the friction between the wheel assembly housing 602 and the inner side of the vertical web of the C-shaped channel of the track 202. In a preferred embodiment, the friction-reducing pad 900 is made of a lubricious polymeric material such as NYLATRON®.

FIG. 10 illustrates the networking between the cable 404, the second frame pulley 408, the third frame pulley 412, and the winch 410. When the fixed displacement pump 416 is being powered by the engine 418, the winch 410 may be rotated such that the cable 404 moves through the network of pulleys to advance the movable trolley 204 along the tracks 202.

After the cable-driven liner loading system 104 has been arranged in a trailer bed 102 and the invertible liner 100 has been threaded over the movable trolley 20 of the cable-driven liner loading system 14 and, if present, the back roller 24, a first layer of the invertible liner 100 is laid directly on the bed of the trailer bed 102 by moving the movable trolley 204 in the first direction. After the trolley has traveled at least substantially the length of the trailer bed in the first direction, the direction of the movable trolley 204 is reversed and a second layer of the invertible liner 100 is stacked on top of the first layer by moving the movable trolley 204 in the second direction. By repeatedly alternating between moving the movable trolley 204 in a first direction and a second direction after the movable trolley 204 has traveled substantially the length of the trailer bed 102 (or for as far along the trailer bed 102 as desired for a particular loading condition), the invertible liner 100 is stacked in a serpentine manner on the trailer bed 102.

Figure 11:
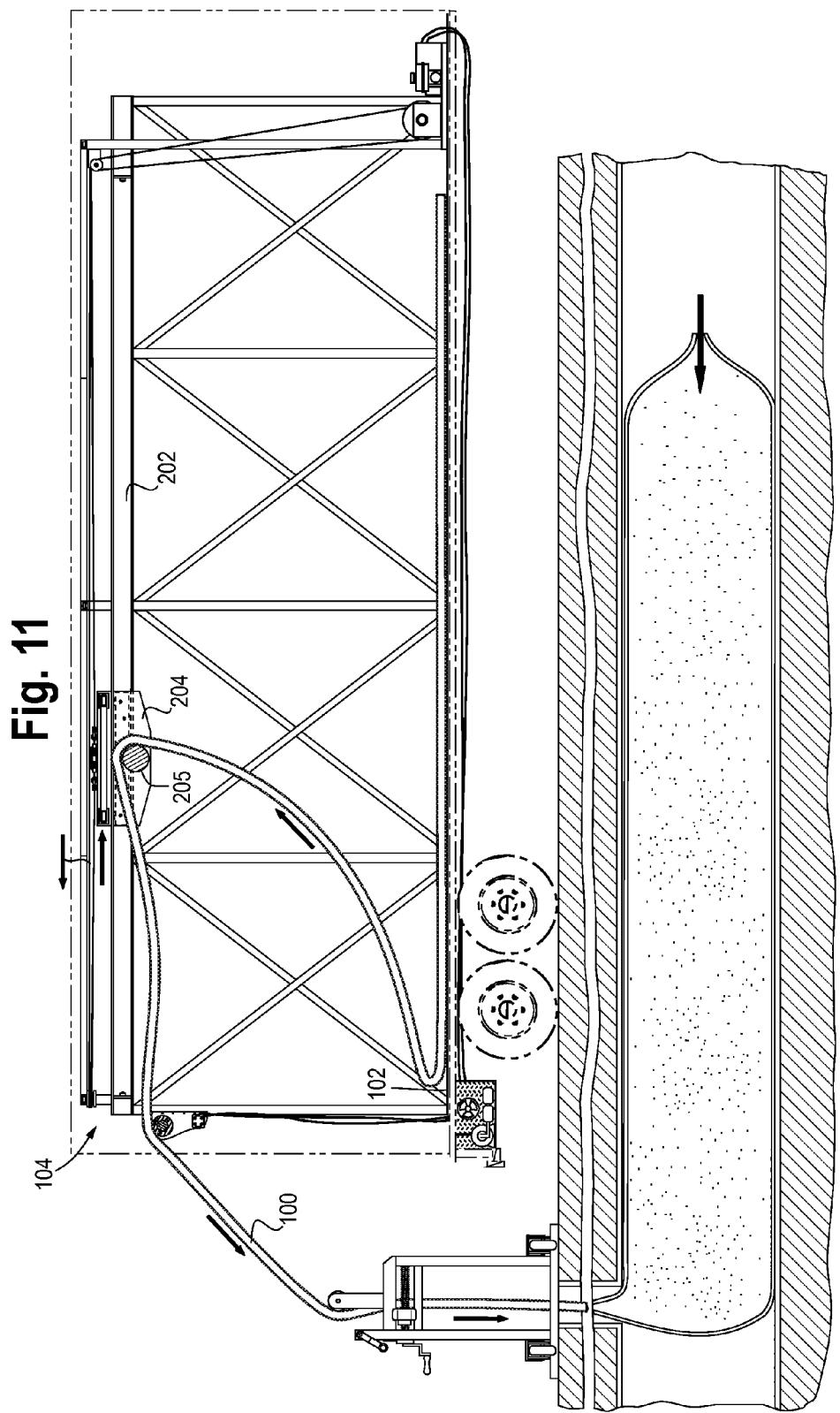
FIG. 11 is a side view of a trailer bed with the tires, walls, and roof thereof illustrated in dashed lines for clarity, with a cable-driven liner loading system of the present disclosure provided therein and a liner being unloaded from the trailer bed and fed to a frame for inversion and deployment down a manhole and along an underground conduit.

FIG. 11 illustrates unloading of an invertible liner 100 from a trailer bed 102 using the cable-driven liner loading system 104 of the present disclosure. As is the case with loading the invertible liner 100 onto the trailer bed 102 using the cable-driven liner loading system 104, the invertible liner 100 is threaded over the roller 205 of the movable trolley 204 and the back roller 208. If the cable-driven liner loading system 104 has a back roller driving system 500, as opposed to merely an idle-roller for its back roller 208, the direction in which the back roller 208 is driven is reversed for the operation of unloading the invertible liner 100. When unloading the invertible liner 100 from the trailer bed 102, moving the movable trolley 204 in a first linear direction for the distance of the top layer of invertible liner 100 stacked on the trailer bed 102 causes the invertible liner 100 to be fed over the top of the back roller 208 out of the cable-driven liner loading system 104. Reversing the movable trolley 204 after traveling the distance of the top layer of the invertible liner 100, which is stacked in a serpentine-like manner, and moving the movable trolley 204 in the second direction for the distance of the new top layer of invertible liner 100, facilitates the invertible liner 100 to continue be fed over the top of the back roller 208 out of the cable-driven liner loading system 104. By repeating this process of moving the movable trolley 204 in first direction for the length of a top layer of the invertible liner 100, reversing the direction of the movable trolley 204, and then moving the movable trolley 204 in a second direction of the length of each new top layer of the invertible liner 100, the invertible liner 100 can be unloaded from the trailer bed 102 and fed to a frame for inversion and deployment down a manhole and along an underground conduit to be lined.

It will be recognized that as the back roller 208 may either be an idler roller or may be driven by back roller driving system 500, the movable trolley roller 205 may either be an idler roller or may be driven by a trolley roller driving system (not shown), in the form of a chain-driven gear assembly similar to the back roller driving system 500 but provided on one side of the movable trolley 204, which may be powered by a pressure compensated pump. The pressure compensated pump may communicate with the driving system of the movable trolley roller 205 via a fluid power hose and a fluid return hose, which are provided along the inside wall of the trailer but free to travel along the length of the trailer wall. On each end of the trailer, a hydraulic hose reel may be provided to selectively take up, and give up, slack to the respective fluid power hose and the fluid return hose as the movable trolley 204 moves linearly along the frame 200 of the cable-driven liner loading system 104, thereby avoiding snags or entanglements. In embodiments where the movable trolley roller 205 is powered, it is preferable to provide the driven movable trolley roller 205 a non-skid fabric, such as a 2", 2-ply, rough top PVC belting, typically used for conveyor belts or for pulley lagging, which is preferably secured to the movable trolley roller 205 by a suitably-strong adhesive, such as SCOTCH-GRIP High Performance Contact Adhesive 1357 from 3M of St. Paul, Minn. The non-skid fabric provides the movable trolley roller 205 with sufficient friction to temporarily stick to the invertible liner 100, but without causing damage to the liner 100.

FIG. 12 illustrates the invertible liner 100 being unloaded from the trailer bed 102 using the cable-driven liner loading system 104 and fed to a deployment apparatus 1300 for inversion and deployment down a manhole and along an underground conduit. The inversion of the invertible liner 100 as it goes through the deployment apparatus 1300 causes the resin-impregnated fabric layer 101, previously disposed within a film-like outer layer of the invertible liner 100, to be on the external side of the invertible liner 100. High pressure air is inserted into the invertible liner 100 through the port 110 in the invertible liner, causing the liner to expand to the contours of the underground conduit into which it is inserted. Upon such expansion, the now-external resin-impregnated fabric layer 101 of the invertible liner 100 comes into contact with, and becomes adhered to, the walls of the underground conduit.

Figure 13:
FIG. 13 is a cross-sectional view taken along lines 13-13 of FIG. 12, illustrating the manner in which the liner is secured to the frame for inversion and deployment into the manhole.

FIG. 13 is an enlarged view of the deployment apparatus 1300 and the manner in which the invertible liner 100 is secured to the deployment apparatus 1300. The circumferential end of the invertible liner 100 is wrapped partially around the deployment apparatus 1300, and the sides of the invertible liner 100 are separated by the deployment apparatus 1300 such that the invertible liner 100 can be inverted by being fed through itself.

While the cable-driven liner system of the present disclosure has been described with respect to various embodiments thereof, it will be understood by those of ordinary skill in the art that variations can be made thereto which are still considered within the scope of the appended claims.

What is claimed is:
1. A cable-driven liner loading system comprising:
a rectangular-shaped frame;

two inner-facing C-shaped channels running the length of the frame on opposite sides of the frame, each of the C-shaped channels defining a track;
a movable trolley engaged with the tracks;
a pulley system having a first frame pulley assembly secured to an upper rear portion of the frame, second and third frame pulleys secured to an upper front portion of the frame, a winch disposed below the second and third frame pulleys, and a cable networking the first frame pulley, the winch, the trolley, and the second and third frame pulleys such that movement of the cable drives the trolley along the tracks; and
a fixed displacement pump operably connected to the winch, the fixed displacement pump being in communication with a controller, the controller regulating operation of the winch by the displacement pump.

2. The cable-driven liner loading system of claim 1, further including a plurality of halos connecting upper webs of the C-shaped channels, each halo including a crossbar assembly connected perpendicularly to each side of the frame, the halos disposed at spaced intervals from one another.

3. The cable-driven liner loading system of claim 2, wherein the frame includes an odd number of halos.

4. The cable-driven liner loading system of claim 2, wherein the crossbar assembly is a single beam.

5. The cable-driven liner loading system of claim 2, wherein the frame is laterally collapsible.

6. The cable-driven liner loading system of claim 5, wherein the crossbar assembly includes at least three crossbars arranged telescopically, with an inner crossbar extending substantially the width of the frame encircled at each end by invertible cross bars connected perpendicularly to opposite sides of the frame.

7. The cable-driven liner loading system of claim 1, wherein the first frame pulley assembly secured to the upper rear portion of the frame includes two pulleys disposed along a plane perpendicular to the second and third frame pulleys.

8. The cable-driven liner loading system of claim 7, wherein the two pulleys of the first frame pulley assembly are offset from one another in longitudinal and latitudinal directions within the plane perpendicular to the second and third frame pulleys.

9. The cable-driven liner loading system of claim 1, further including a back roller rotatably connected to an upper rear end of the frame.

10. The cable-driven liner loading system of claim 8, wherein the back roller is covered in a friction-increasing material.

11. The cable-driven liner loading system of claim 9, wherein the friction-increasing material is vulcanized rubber.

12. The cable-driven liner loading system of claim 9, further comprising a back roller driving mechanism operably connected to the back roller.

13. The cable-driven liner loading system of claim 12, wherein the back roller driving mechanism includes a pressure compensated pump.

14. The cable-driven liner loading system of claim 13, wherein the fixed displacement pump operably connected to the winch and the pressure compensated pump operably connected to the back roller are arranged with an engine in a stacked manner.

15. The cable-driven liner loading system of claim 13, wherein at least one of the fixed displacement pump operably connected to the winch, or the pressure compensated pump operably connected to the back roller, is controllable via a remote control.

16. The cable-driven liner loading system of claim 15, wherein the remote control is a wireless remote control.

17. The cable-driven liner loading system of claim 1, wherein the winch has a plurality of circumferential cable grooves and a ratio of the number of cable grooves containing the cable of the pulley system relative to the number of cable grooves in total is less than one.

18. The cable-driven liner loading system of claim 1, wherein the fixed displacement pump is operably connected to a battery-operated engine.

19. The cable-driven liner loading system of claim 18, further comprising a housing for the battery-operated engine containing a cooling fan.

20. The cable-driven liner loading system of claim 1, further comprising a plurality of D-rings attached to vertical members of a rear end of the frame.

21. The cable-driven liner loading system of claim 1, wherein the movable trolley includes a wheel assembly and wheel assembly housing.

22. The cable-driven liner loading system of claim 21, wherein each wheel assembly includes a plurality of wheel bearings.

23. The cable-driven liner loading system of claim 22, wherein each wheel assembly includes two upper wheel bearings and two lower wheel bearings.

24. The cable-driven liner loading system of claim 23, wherein one upper wheel bearing is adjacent to a leading end of the wheel assembly housing and the other upper wheel bearing is adjacent to a trailing end of the wheel assembly housing, with the lower wheel bearings disposed in a direction along the length of the rectangular frame, inboard of the upper wheel bearings.

25. The cable-driven liner loading system of claim 1, wherein a friction-reducing pad is secured to an outer side of the wheel assembly housing between the vertical web of the C-channel and the wheel assembly housing.

26. The cable-driven liner loading system of claim 1, wherein the control is a manual controller.

27. The cable-driven liner loading system of claim 21, wherein the controller is an automated controller having a microswitch located in the lower web of the C-channel near either end of the track, which signals to the fixed displacement pump to selectively stop, or reverse direction of, the trolley upon contact between a microswitch and the wheel assembly.

28. A method of loading a liner onto a trailer bed using a cable-driven liner loading system, comprising:
arranging a cable-driven liner loading system in a trailer;
threading a liner over a movable trolley driven by a winch driven by a pressure compensated pump of the cable-driven liner loading system;
laying down a first layer of the liner on a trailer bed by moving the movable trolley in a first direction, causing the liner to be fed over the top of the movable trolley onto the trailer bed;
reversing the direction of the movable trolley after the trolley has traveled at least substantially the length of the trailer bed in the first direction using the cable-driven liner loading system;
laying down a second layer of the liner on the first layer of the liner by moving the movable trolley in a second direction, causing the liner to be fed over the top of the movable trolley onto the first layer of the liner;
continuing to stack the liner upon itself in a serpentine manner by feeding the liner over the top of the movable trolley and repeatedly reversing the direction of the movable trolley from the first direction to the second direction after the trolley has traveled at least substantially the length of the trailer bed in the first direction and from the second direction to the first direction after the trolley has traveled at least substantially the length of the trailer bed in the second direction using the cable-driven liner loading system.

29. The method of loading a liner onto a trailer bed using a cable-driven liner loading system of claim 28, wherein reversing the direction of the movable trolley using the cable-driven liner loading system is automated and occurs by switching a microswitch disposed in a track of the cable-driven liner loading system by contact between the microswitch and a wheel assembly of the movable trolley.

30. The method of loading a liner onto a trailer bed using a cable-driven liner loading system of claim 28, additionally comprising the step of threading a liner over a back roller of the cable-driven liner loading system.

* * * * *